(12) United States Patent
Weng

(10) Patent No.: US 10,338,340 B2
(45) Date of Patent: Jul. 2, 2019

(54) VISUAL CAMERA BEARING STRUCTURE CAPABLE OF SUPPORTING BARREL LENS OF A LARGE AREA

(71) Applicant: FUNDER ELECTRONIC GLOBAL CO., LTD., Taipei (TW)

(72) Inventor: Wai-How Weng, Taipei (TW)

(73) Assignee: FUNDER ELECTRICAL GLOBAL CO., LTD., Taipei (TW)

( * ) Notice: Subject to any disclaimer, the term of this patent is extended or adjusted under 35 U.S.C. 154(b) by 0 days.

(21) Appl. No.: 15/683,786

(22) Filed: Aug. 23, 2017

(65) Prior Publication Data

US 2019/0064470 A1  Feb. 28, 2019

(51) Int. Cl.
*H04N 5/225* (2006.01)
*H01L 31/0203* (2014.01)
*G02B 7/02* (2006.01)

(52) U.S. Cl.
CPC ............. *G02B 7/021* (2013.01); *G02B 7/025* (2013.01); *G02B 7/026* (2013.01); *H04N 5/2253* (2013.01); *H04N 5/2254* (2013.01)

(58) Field of Classification Search
CPC .... H04N 5/2253; H04N 5/2254; G02B 7/025; G02B 7/026
See application file for complete search history.

(56) References Cited

U.S. PATENT DOCUMENTS

| 7,528,884 B2* | 5/2009 | Minamio | H01L 27/14618 250/208.1 |
| 7,643,081 B2* | 1/2010 | Webster | H04N 5/2253 348/340 |
| 8,064,146 B2* | 11/2011 | Iwasaki | G02B 7/022 348/374 |
| 8,525,925 B2* | 9/2013 | Jannard | H04N 5/2252 348/373 |
| 8,891,007 B2* | 11/2014 | Pavithran | H04N 5/2252 348/374 |
| 9,225,887 B1* | 12/2015 | Hsu | H04N 5/2254 |
| 2010/0254027 A1* | 10/2010 | Genda | G02B 13/0035 359/738 |

* cited by examiner

Primary Examiner — Ngoc Yen T Vu
(74) Attorney, Agent, or Firm — Leong C. Lei

(57) ABSTRACT

A visual camera bearing structure includes: a shaft body, having a top end portion and bottom end portion; a through hole, configured inside the shaft body, one end of the through hole being in communication with the bottom end portion of the shaft body, another end thereof the top end portion of the shaft body, and the top end portion formed with a lens barrel accommodation opening; and a barrel lens support having a larger diameter, configured on an outer peripheral wall of the top end portion of the shaft body. Whereby, the barrel lens support is allowed to support the lens accommodation portion having a large area stably, thereby overcoming the condition of conventional visual cameras being difficult to be configured with a barrel lens having a large area.

14 Claims, 4 Drawing Sheets

VISUAL CAMERA BEARING STRUCTURE CAPABLE OF SUPPORTING BARREL LENS OF A LARGE AREA

TECHNICAL FIELD OF THE INVENTION

The present invention relates to a visual camera bearing structure, especially for visual camera that sense external images, and more particularly to a visual camera bearing structure capable of supporting barrel lens of a large area, and to a lens seat, shaft body, barrel lens support, a lens barrel and lens accommodation portion having a large area of the visual camera bearing structure.

DESCRIPTION OF THE PRIOR ART

Visual cameras applied on electronic products such as monitors, cameras, video cameras, mobile phones and computers are usually used with a lens barrel arranged in groups with a filter and image sensing chip to sense and capture external images, and the images are then converted to data so as to be displayed on a screen, which has already been a prior art.

In conventional visual cameras, the lens 3a, image sensing chip 4a and filter 5a mentioned above, as FIG. 1 shows, are mainly accommodated in a lens seat 1a, and the top of the lens seat 1a has a shaft body 2a, the top of which is in communication with the lens seat 1a through a through hole 23a; the lens barrel 3a is installed inside the through hole 23a at the top end portion of the shaft body 2a, allowing the lens inside the lens barrel 3a to correspond to the filter 5a and image sensing chip 4a inside the lens seat 1a through the through hole 23a. Therefore, the image sensing chip 4a can sense and capture external images through the filter 5a, through hole 23a and the lens of the lens barrel 3a.

However, conventional lens barrels 3a all are a cylindrical body having the same diameter at both ends. To enable the lens barrel 3a to be installed inside the through hole 23a, the lens inside the lens barrel 3a must be smaller than the lens barrel 3a and through hole 23a in area, causing the conventional visual cameras difficult to be configured with a large area of lens inside the lens barrel 3a.

SUMMARY OF THE INVENTION

To overcome the defects mentioned above, the present invention is proposed.

The present invention proposes a visual camera bearing structure, including: a shaft body, having a top end portion and bottom end portion; a through hole, configured inside the shaft body, one end of the through hole being in communication with the bottom end portion of the shaft body, another end thereof the top end portion of the shaft body, and the top end portion formed with a lens barrel accommodation opening; and a barrel lens support having a larger diameter, configured on an outer peripheral wall of the top end portion of the shaft body.

According to the visual camera bearing structure, an inside of the lens barrel accommodation opening is configured with a lens barrel, two ends of the lens barrel are respectively configured with a base capable of being placed in the lens barrel accommodation opening and a lens accommodation portion exposed out of the lens accommodation opening, the area of the lens accommodation portion is larger than the one of the base, allowing an outer ring edge portion of the lens accommodation portion to be radially extended to correspond to the barrel lens support, and the outer ring edge portion of the lens accommodation portion is attached to the barrel lens support.

According to the visual camera bearing structure, an outer rim of the lens barrel accommodation opening is configured with a raised ring, and the outer ring edge portion of the lens accommodation portion an annular groove combinable with the raised ring corresponding to the raised ring.

According to the visual camera bearing structure, a positioning adhesive receiving groove is configured on an inner wall of the through hole, and viscose or UV glue is filled between the positioning adhesive receiving groove and lens barrel.

According to the visual camera bearing structure, the bottom end portion of the shaft body is configured on a lens seat, one end of the through hole is in communication with an inside of the lens seat, and the inside of the lens seat is formed with an image chip accommodation groove.

According to the visual camera bearing structure, an image sensing chip and filter are configured inside the image chip accommodation groove, allowing the filter to be positioned between the lens barrel and image sensing chip.

According to the visual camera bearing structure, the lens seat or shaft body is configured with an elastic clip capable of holding an electric line.

According to the visual camera bearing structure, the barrel lens support is an annular plate.

Whereby, the barrel lens support supporting stably the lens accommodation portion having a large area improves the combination, positioning and supporting effects of the lens seat and shaft body to the lens barrel having a lens of a large area, and overcomes the condition of conventional visual cameras being difficult to be configured with a barrel lens having a large area.

DETAILED DESCRIPTION OF THE PREFERRED EMBODIMENTS

Figure 1:
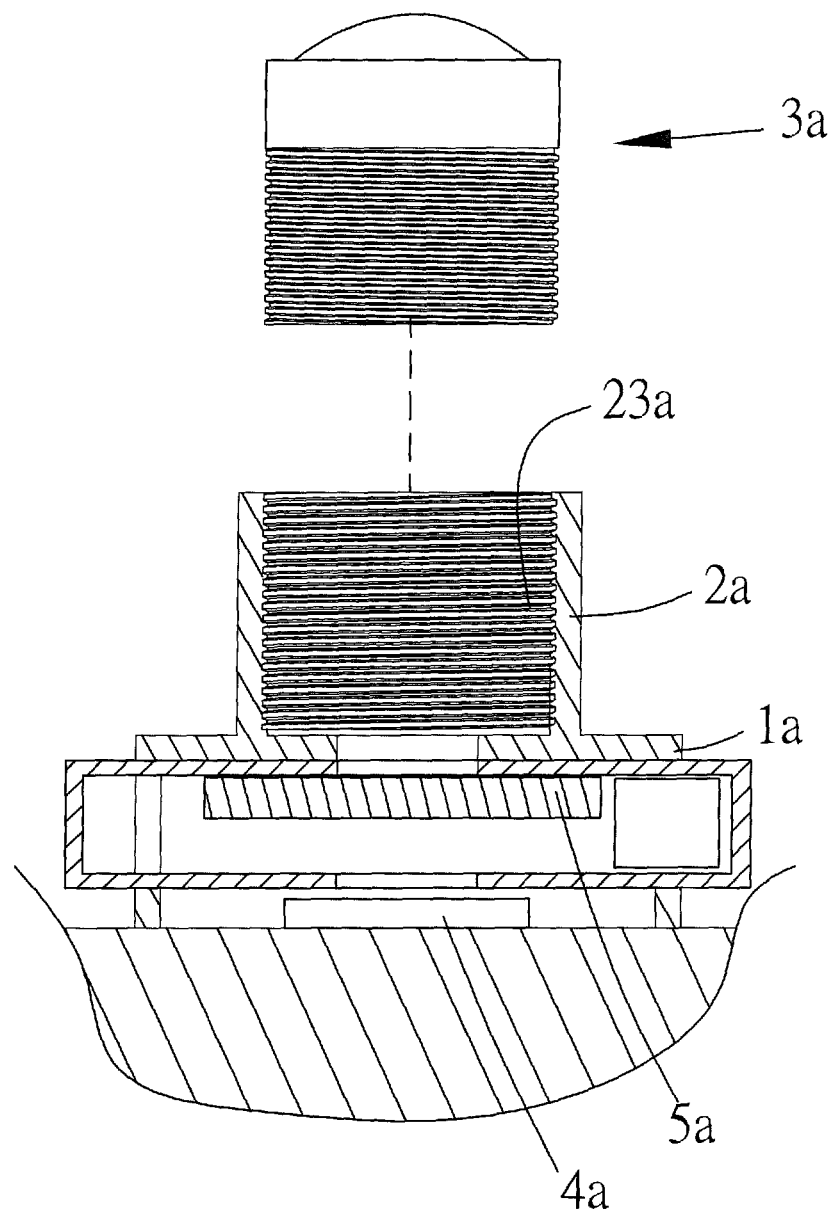
FIG. 1 is a cross-sectional view of an exemplary conventional visual camera.
Figure 2:
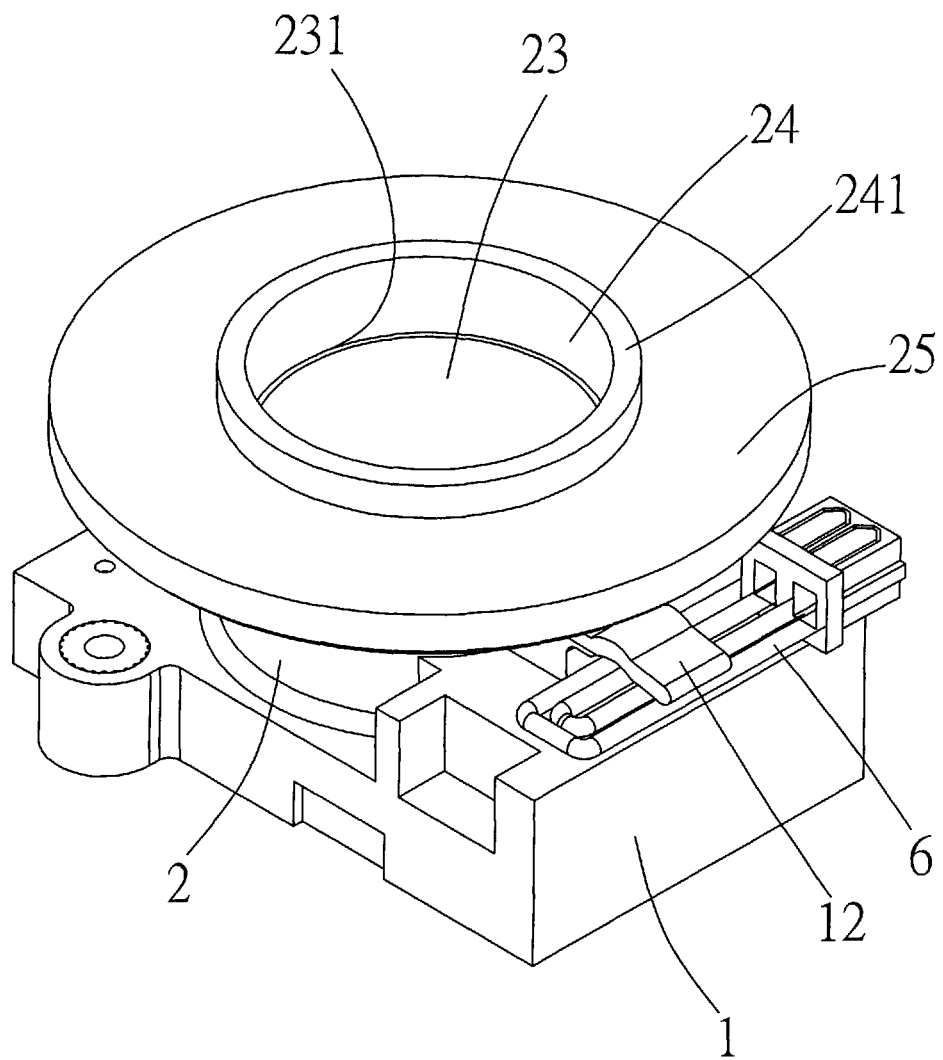
FIG. 2 is a perspective view of a preferred embodiment of the present invention.
Figure 3:
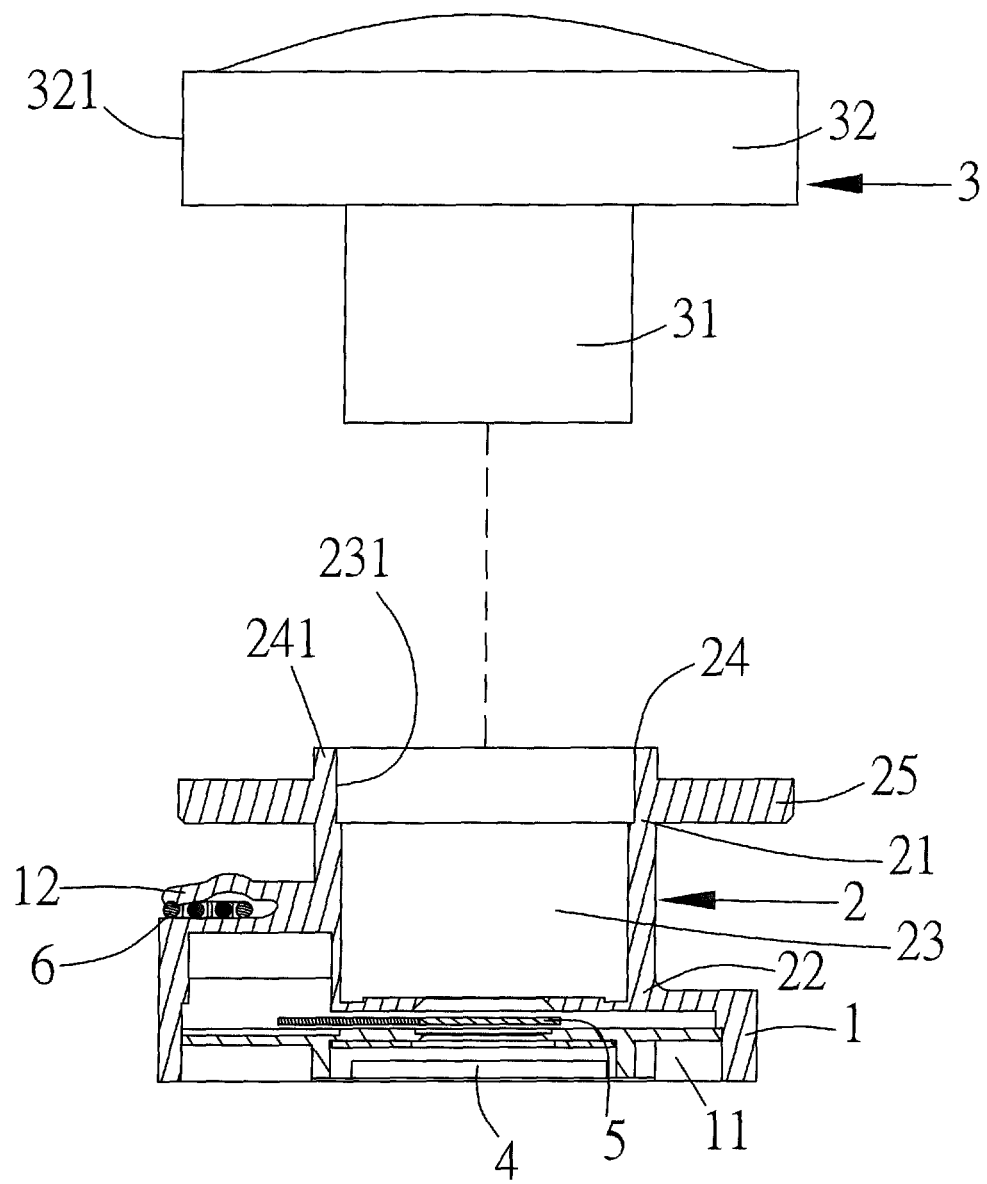
FIG. 3 is a exploded cross-sectional view of a lens seat, shaft body and lens barrel shown in FIG. 2.
Figure 4:
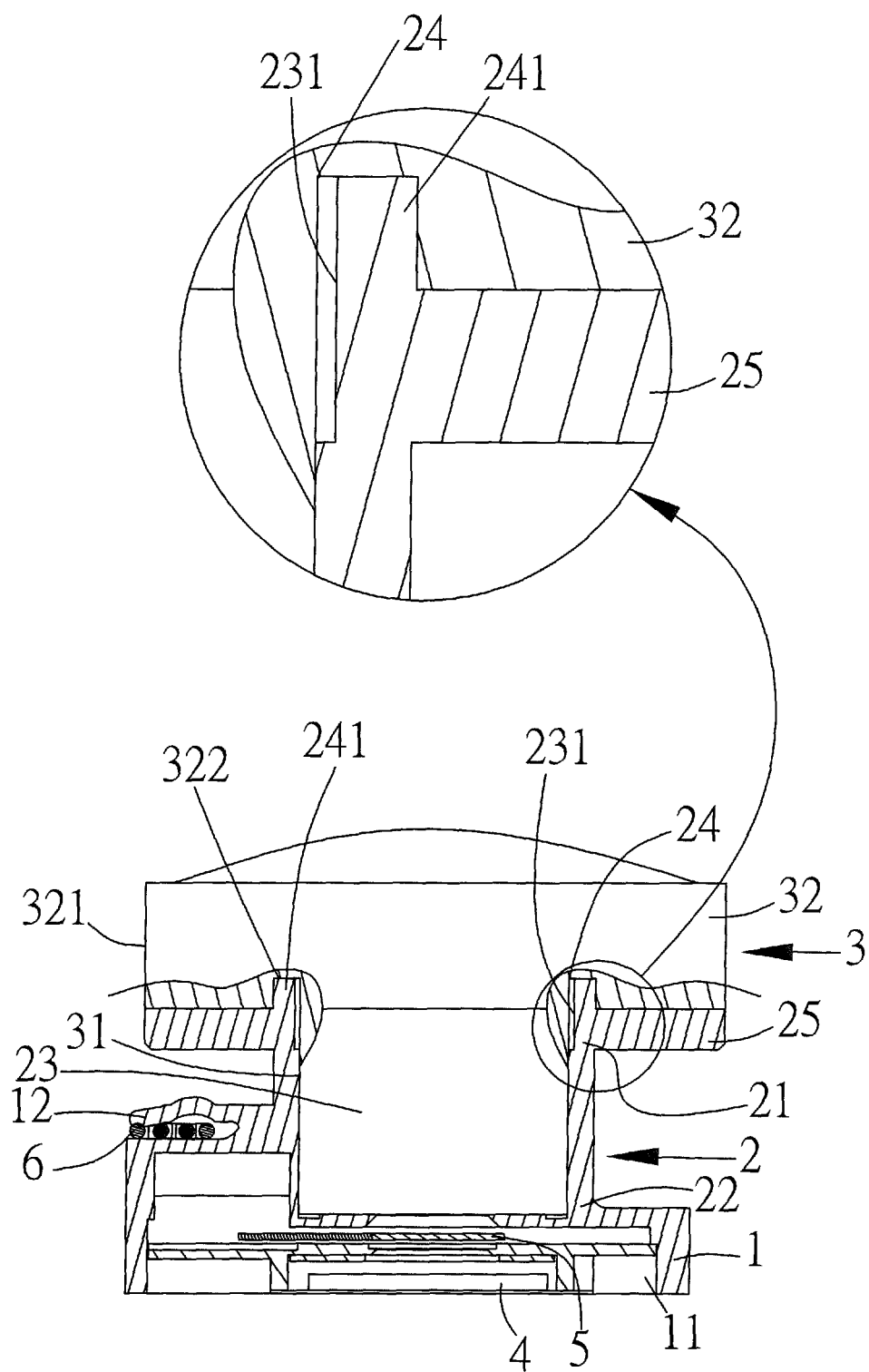
FIG. 4 is a cross-sectional view of a lens seat, shaft body and lens barrel shown in FIG. 3 while in combination with one another.

Referring to FIGS. 2 to 4, a visual camera bearing structure of the present invention, in a preferred embodiment, includes a lens seat 1, shaft body 2 and lens barrel 3, where the shaft body 2 has a top end portion 21 and bottom end portion 22; the bottom end portion 22 is configured on the top of the lens seat 1, and inside the shaft body 2 is configured a through hole 23, one end of which is in communication with the bottom end portion 22 of the shaft body 2 and the inner part of the lens seat 1. Furthermore, an image chip accommodation groove 11 is formed inside the lens seat 1, and another end of the through hole 23 is in communication with the top end portion 21 of the shaft body 2, on which a lens barrel accommodation opening 24 is formed. In addition, an image sensing chip 4 and filter 5 are configured on the image chip accommodation groove 11, allowing the filter 5 to be positioned between the lens barrel 3 and image sensing chip 4.

In a preferred embodiment, the outer peripheral wall of the top end portion 21 is configured with a barrel lens (a lens in a lens barrel) support 25 having a larger diameter, which may be an annular plate. The bottom of the lens barrel 3 is configured with a base 31 installable in the lens barrel accommodation opening 24, and the top thereof may be configured with a lens accommodation portion 32 exposable out of the lens barrel accommodation opening 24, allowing the lens barrel 3 to be configured in the lens barrel accommodation opening 24 through the base 31; a large area of lens is accepted inside the lens accommodation portion 32, and the areas (cross-sectional areas) of the lens accommodation portion 32 and lens therein all are larger than the area (cross-sectional area) of the base 31, allowing an outer ring edge portion 321 of the lens accommodation portion 32 to be extended radially to correspond to the barrel lens support 25, and the bottom face of the outer ring edge portion 321 of the lens accommodation portion 32 to be attached to the top face of the barrel lens support 25.

It can be understood that the barrel lens support 25 formed by radially extending the outer peripheral wall of the top end portion 21 of the shaft body 2 can be used to support stably the lens accommodation portion 32 having a larger diameter configured on the top end portion of the lens barrel 3 for the accommodation of a lens having a large area so that the lens accommodation portion 32 and the lens having a large area therein can also be combined with and drawn close to the barrel lens support 25 without causing the lens barrel 3 to be loose or resulting in visual focal length deviation even if the lens barrel 3 is subjected to external shock, vibration or shaking, thereby improving the combination, positioning and supporting effects of the lens seat 1 and shaft body 2 to the lens barrel 3 having a large area of lens.

Referring FIGS. 2 to 4 again, the outer rim of the lens barrel accommodation opening 24, in a viable embodiment, is configured with a raised ring 241, and the bottom face of the outer ring edge portion 321 of the lens accommodation portion 32 is configured with an annular groove 322 combinable with the raised ring 241 corresponding to the raised ring 241; the annular groove 322 of the outer ring edge portion 321 of the lens accommodation portion 32 can be positioning combination with the raise ring of the lens barrel accommodation opening 24 when the outer ring edge portion 321 of the lens accommodation portion 32 is attached to the top face of the barrel lens support 25, further improving the combination and positioning effects of the lens seat 1 and shaft body 2 to the lens barrel 3.

Referring to FIGS. 3 and 4, the inner annular wall of the through hole 23, in another viable embodiment, is configured with a positioning adhesive receiving groove 231 in communication with the lens barrel accommodation opening 24; viscose or UV glue can be filled between the positioning adhesive receiving groove 231 and lens barrel 3 when the base 31 of the lens barrel 3 is placed in the lens barrel accommodation opening 24, thereby sticking and fixing quickly, simply the base 31 of the lens barrel 3 in the lens barrel accommodation opening 24.

In a further viable embodiment, the lens base 1 or shaft body 2 is configured with an elastic clip 12, where the elastic clip 12 is extended out from the bottom end portion 22 of the shaft body 2 toward one side of the lens base 1, capable of holding a power line 6 or image data transmission line 6 of the visual camera, and positioning it between the elastic clip 12 and the outer wall (or top face) of the lens seat 1, thereby retaining the electric line 6 simply and conveniently.

I claim:

1. A visual camera bearing structure, comprising:
    a shaft body, having a top end portion and bottom end portion;
    a through hole, configured inside said shaft body, one end of said through hole being in communication with said bottom end portion of said shaft body, another end thereof said top end portion of said shaft body, and said top end portion formed with a lens barrel accommodation opening; and
    a barrel lens (a lens in a lens barrel) support having a larger diameter, configured on an outer peripheral wall of said top end portion of said shaft body;
    wherein an inside of said lens barrel accommodation opening is configured with a lens barrel, two ends of said lens barrel are respectively configured with a base capable of being placed in said lens barrel accommodation opening and a lens accommodation portion exposed out of said lens accommodation opening, the area of said lens accommodation portion is larger than the one of said base, allowing an outer ring edge portion of said lens accommodation portion to be radially extended to correspond to said barrel lens support, and said outer ring edge portion of said lens accommodation portion is attached to said barrel lens support; an outer rim of said lens barrel accommodation opening is configured with a raised ring, and said outer ring edge portion of said lens accommodation portion an annular groove combinable with said raised ring corresponding to said raised ring.

2. The structure according to claim 1, wherein a positioning adhesive receiving groove is configured on an inner wall of said through hole, and viscose or UV glue is filled between said positioning adhesive receiving groove and lens barrel.

3. The structure according to claim 2, wherein said bottom end portion of said shaft body is configured on a lens seat, one end of said through hole is in communication with an inside of said lens seat, and said inside of said lens seat is formed with an image chip accommodation groove.

4. The structure according to claim 3, wherein an image sensing chip and filter are configured inside said image chip accommodation groove, allowing said filter to be positioned between said lens barrel and image sensing chip.

5. The structure according to claim 3, wherein said lens seat or shaft body is configured with an elastic clip capable of holding an electric line.

6. The structure according to claim 1, wherein a positioning adhesive receiving groove is configured on an inner wall of said through hole, and viscose or UV glue is filled between said positioning adhesive receiving groove and lens barrel.

7. The structure according to claim 6, wherein said bottom end portion of said shaft body is configured on a lens seat, one end of said through hole is in communication with an inside of said lens seat, and said inside of said lens seat is formed with an image chip accommodation groove.

8. The structure according to claim 7, wherein an image sensing chip and filter are configured inside said image chip accommodation groove, allowing said filter to be positioned between said lens barrel and image sensing chip.

9. The structure according to claim 7, wherein said lens seat or shaft body is configured with an elastic clip capable of holding an electric line.

10. The structure according to claim 1, wherein a positioning adhesive receiving groove is configured on an inner wall of said through hole, and viscose or UV glue is filled between said positioning adhesive receiving groove and lens barrel.

11. The structure according to claim 10, wherein said bottom end portion of said shaft body is configured on a lens seat, one end of said through hole is in communication with an inside of said lens seat, and said inside of said lens seat is formed with an image chip accommodation groove.

12. The structure according to claim 11, wherein an image sensing chip and filter are configured inside said image chip accommodation groove, allowing said filter to be positioned between said lens barrel and image sensing chip.

13. The structure according to claim 11, wherein said lens seat or shaft body is configured with an elastic clip capable of holding an electric line.

14. The structure according to claim 1, wherein said barrel lens support is an annular plate.

* * * * *